J. F. GREER & J. S. WITHERELL.
HAY RAKE.
APPLICATION FILED JAN. 27, 1911.
1,031,998.
Patented July 9, 1912.
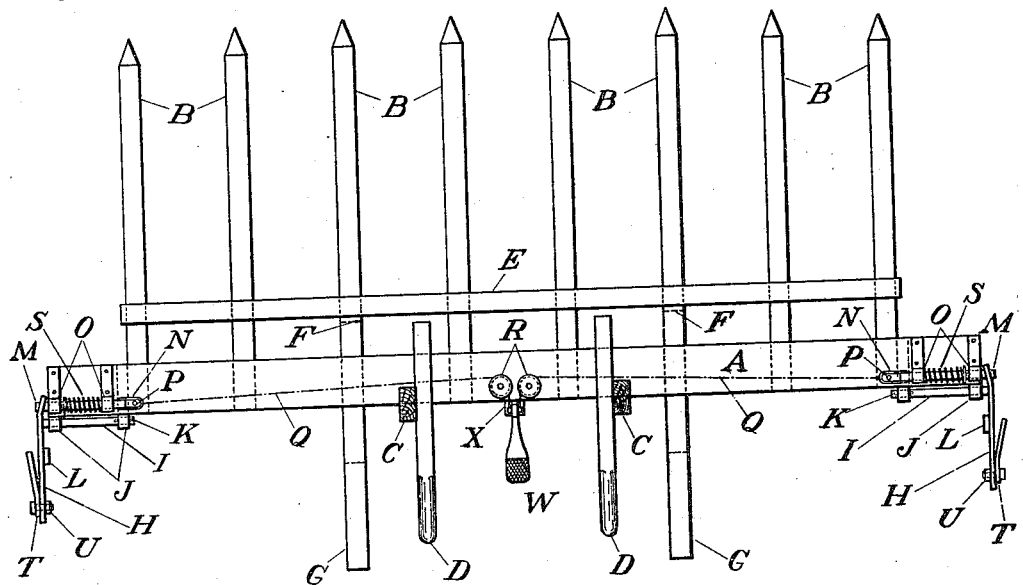
Fig. 1.
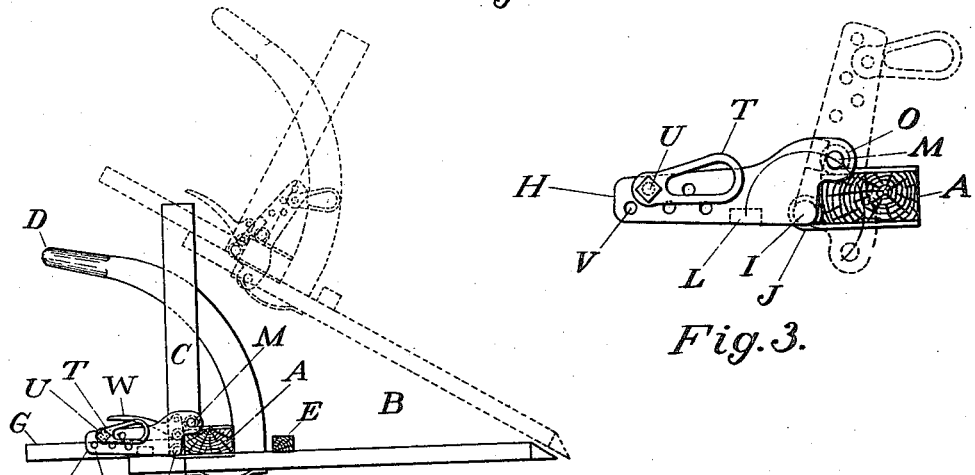
Fig. 2.
Fig. 3.
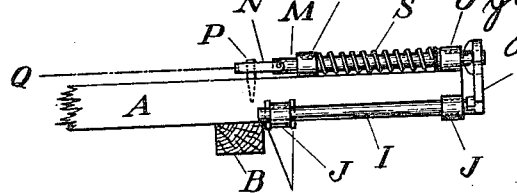
Fig. 4.
WITNESSES
F. Schneider
J. L. Charles
INVENTORS
Joseph F. Greer
James S. Witherell

UNITED STATES PATENT OFFICE.

JOSEPH F. GREER, OF PALO ALTO, AND JAMES S. WITHERELL, OF STANFORD UNIVERSITY, CALIFORNIA.

HAY-RAKE.

1,031,998.          Specification of Letters Patent.          Patented July 9, 1912.

Application filed January 27, 1911. Serial No. 604,976.

*To all whom it may concern:*

Be it known that we, JOSEPH F. GREER, residing in the city of Palo Alto, county of Santa Clara, State of California, and JAMES S. WITHERELL, residing at Stanford University, in said county and State, and both citizens of the United States, have jointly invented a new and useful Improvement in Hay-Rakes, of which the following is a specification, reference being hereby made to the accompanying drawing, forming a part hereof.

This invention relates to a hay rake of the wheelless type in which the horses drawing the rake walk on either side and in advance of the rake teeth. This style of rake is usually employed in forming windrows of hay into cocks.

The primary object of this invention is to provide a hay rake of a well known type with a mechanical device by means of which the tractive force is rendered operative for dumping the rake, with a minimum of effort on the part of the operator.

The invention will be more fully explained hereinafter with reference to the accompanying drawings in which it is illustrated and in which:—

Figure 1 is a plan view of a hay rake embodying the features of the invention. Fig. 2 is a side view of the rake. That portion drawn in full lines shows the mechanism in proper adjustment for dragging the rake along the ground, and the dotted portion shows the rake and mechanism in the act of dumping. Fig. 3 is a partial end view of the rake. Fig. 4 is a rear view of one end of the rake and shows the relationship of the latch and dumping mechanism.

A is the body of the rake and to it are rigidly attached the rake teeth B B, the posts C C and the handles D D. E is a crossbar bolted to the teeth to brace them. These foregoing are generally made of wood and form the essential parts of a hay rake of this type. Several minor details, such as reinforcing straps, bolts and screws, which are not required for a correct understanding of this invention, have been omitted.

Under the heels of two or more of the teeth are fastened shoes F F, and within convenient reach of the operator are foot rests G G.

H H are arms integral with shafts I I, which are pivotally attached to the rear of timber A by means of bearings J J, and are kept from lateral movement by the pins K K. On the inner sides of the arms H H are securely fastened lugs L L.

M M are latch bolts sliding in bearings O O which are fastened to the top of timber A. Bolts M M are operated by means of pressure upon the foot lever W, connection thereto being made by flexible cords, cables or chains Q Q which run over pulleys R R.

X is the fulcrum of the lever W. When the pressure upon the foot lever is removed, the bolts are returned into place by the springs S S.

N N, are clevises which form the connection between the cords Q Q and the latch bolts M M.

P P are pins attached to A and act as stops to prevent the bolts M M from being pulled back too far.

T T are links to which the horses are hitched, and are pivotally bolted to the arms H H by bolts U U which are inserted in the holes V V. When these bolts are placed in those holes farthest from the fulcrum, the leverage exerted by the pull of the horses is greatest.

The movement of the arm H relative to the rake is limited to the two extremes shown in Fig. 3. In its normal position, indicated by the full lines, it is held by the latch bolt M. When the latch is withdrawn, the arm cannot fall back because its bent portion still engages the front of the bolt. It is, however, free to swing upward to the vertical position indicated by the dotted lines, where it is stopped by the contact of the lug L against the latch bolt M.

When being used, the rake is drawn along the ground in the position shown by the full line portion of Fig. 2, the arms H H being locked in normal position. With the mechanism in this position, the rake is drawn along a windrow of hay. Should the rake teeth catch in the ground and interfere with the work, the operator may raise them clear of the ground by standing upon the foot rests G G, the shoes F F acting as fulcrums. When a sufficient amount of hay has been gathered, it becomes necessary to dump the rake, leaving the load in a pile.

By the use of our invention, the second man is dispensed with. When the driver wishes to dump, he presses upon the foot lever W thus tripping the latches M M and releasing the arms H H. The horses pull these arms forward and upward to the vertical position shown in Fig. 3, where a further pull results in tilting the rake forward, digging the rake teeth B—B into the ground. As soon as the teeth engage the ground, the rake begins to overturn as indicated by the dotted line portion of Fig. 2, and the dumping is completed as in the previous case, the rake rolling completely over, until the teeth again project horizontally forward. While the rake is turning over, the arms swing back to their normal position, the latch bolts springing into place automatically.

One important feature of our invention is its applicability to hay rakes which are already in use, it being unnecessary to purchase a new rake to enjoy the benefit of this invention.

It is obvious that a hand lever would operate the latch equally well and also that a different form of latch and stop could be employed to hold and release the draft shifter arm.

It will be understood that the details of construction and arrangement may be varied as may be required or desirable for different conditions of use.

Having thus described the nature of our invention, its object and the manner of its operation, we claim as new the following:—

1. The combination with a hay rake capable of progressive movement and of an overturning movement, of means for applying a tractive force thereto at a predetermined point for obtaining the progressive movement and for shifting said tractive force to a different point to effect the overturning movement.

2. The combination with a hay rake capable of progressive movement and of an overturning movement, of a device to which the tractive force is applied, said device being movable to different positions on the vehicle, in one of which the progressive movement of the vehicle is obtained and in another of which the overturning movement is secured, and means for controlling the position of the device.

3. The combination with a hay rake of the wheelless type of a pivotally attached arm to which the tractive force is applied, a fulcrum for said arm, means for holding the arm in an approximately horizontal position for the purpose of moving the rake, means for releasing the arm, and means for holding the arm in an approximately vertical position for the purpose of enabling the tractive force to overturn the rake.

4. The combination with a hay rake capable of progressive movement and of an overturning movement, of an arm pivoted to the vehicle and to which the tractive force is applied, said arm being movable to one position in which the progressive movement of the vehicle is obtained and swinging to another position in which the overturning movement is secured, and means for controlling the position of the arm.

5. The combination with a hay rake capable of being overturned of a pivotally attached arm to which the tractive force is applied, a fulcrum for said arm, means for holding the arm in an approximately horizontal position for the purpose of moving the rake, means for releasing the arm, and means for holding the arm in an approximately vertical position for the purpose of enabling the tractive force to overturn the vehicle.

6. The combination with a rake, of an arm pivoted to the rake, a draft device connected to the arm at one side of its pivot, means for normally holding the arm in a position to cause the progressive movement of the rake when tractive force is applied to the draft device, said arm being movable to a different position to cause the overturning movement of the rake when released from the holding means, and a stop for limiting the movement of the arm to the overturning position.

JOSEPH F. GREER.
JAMES S. WITHERELL.

Witnesses:
F. SCHNEIDER,
I. L. CHARLES.

---

Copies of this patent may be obtained for five cents each, by addressing the "Commissioner of Patents, Washington, D. C."